(12) United States Patent
Ilnicki et al.

(10) Patent No.: US 7,069,434 B1
(45) Date of Patent: Jun. 27, 2006

(54) SECURE DATA TRANSFER METHOD AND SYSTEM

(75) Inventors: Slawomir K. Ilnicki, Los Altos, CA (US); Troy Shahoumian, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1082 days.

(21) Appl. No.: 09/592,322

(22) Filed: Jun. 13, 2000

(51) Int. Cl.
*H04L 9/00* (2006.01)
*H04K 1/00* (2006.01)

(52) U.S. Cl. .............. 713/153; 713/168; 726/11; 726/14; 380/28; 380/44; 380/259

(58) Field of Classification Search .............. 713/201, 713/178, 166; 709/217, 234, 229; 370/252
See application file for complete search history.

(56) References Cited

U.S. PATENT DOCUMENTS

| | | | | |
|---|---|---|---|---|
| 6,119,167 A * | 9/2000 | Boyle et al. | ................ | 709/234 |
| 6,237,095 B1 * | 5/2001 | Curry et al. | ................. | 713/178 |
| 6,367,009 B1 * | 4/2002 | Davis et al. | ................. | 713/166 |
| 6,539,479 B1 * | 3/2003 | Wu | ............................. | 713/151 |
| 6,584,507 B1 * | 6/2003 | Bradley et al. | ............. | 709/229 |
| 6,611,498 B1 * | 8/2003 | Baker et al. | ................. | 370/252 |
| 6,631,402 B1 * | 10/2003 | Devine et al. | .............. | 709/217 |
| 6,757,825 B1 * | 6/2004 | MacKenzie et al. | ........ | 713/169 |

OTHER PUBLICATIONS

Jablon, "Strong Password-Only Authenticated Key Exchange", Sep. 25, 1996, ACM SIGCOMM Computer Communication Review, p. 5-26.*

* cited by examiner

*Primary Examiner*—Christopher Revak

(57) ABSTRACT

A method and system for securely transferring data between an application server and an agent of the application server through a non-secure node. First, a session key between the agent and the application server is established by utilizing a public key of the application server that is embedded in the code of the agent. Next, an end-to-end secure connection is established between the agent and the application server by using the session key and by establishing a communication link between the application server and the non-secure node by using a relay module.

25 Claims, 8 Drawing Sheets

SECURE DATA TRANSFER METHOD AND SYSTEM

FIELD OF THE INVENTION

The present invention relates generally to data security systems and more specifically to a method and system for securely sending data between an agent in a non-secure (e.g., hostile) environment and a server behind a firewall.

BACKGROUND OF THE INVENTION

Data Collection Application

As an increasing number of businesses offer products and services via the Internet on the World Wide Web (WWW), there is a corresponding need by the businesses for feedback mechanisms to inform the businesses regarding how quickly information requested by users or clients are actually provided. One such feedback mechanism is a data collection application. The data collection application measuring the amount of time it takes for a particular Web page to load in a user's browser. As can be appreciated, the user's view (i.e., the time delay actually experienced by the user) is the most accurate indicator of a particular Web site's performance. In order to obtain a user's view, it is necessary to have an agent that resides at the user's browser. The agent can then record the time delay experienced by the user for a particular web page or other information to be displayed or loaded. The time delay is simply the time that elapses from the time a request (e.g., HTTP request) is initiated by a user selecting a particular link to the time that the Web page is loaded into the user's browser program.

One area where such an application would find use is in on-line brokerage services for the trading of securities. As an on-line brokerage service provider, the business would like to have a mechanism that would differentiate between its users and provide a higher level of service to those customers that have shown themselves to be worthy of a higher level of service. For example, it would be desirable for a business owner to efficiently allocate a more responsive service (e.g., a quicker and more timely connection) to certain clients that meet a predetermined criteria (e.g., length of business relationship, volume of business, etc.).

A data collection application is a key piece in a solution to provide differing levels of service to different users based on predetermined criteria. The data collection (also referred to as a "measuring application") sends measuring agents to the different users. Each of the measuring agents send time stamped information regarding the length of time needed to retrieve pages, download information, receive data, etc. from the user where the agent is located. This time information can be utilized by the data collection application or by another application to allocate resources. Perhaps, if a connection with a "good" client is very poor, a new connection can be utilized for that client or bandwidth can be allocated in some other way to that client. On the other hand, if it is detected that a user, who is not yet a client and simply exploring the web site, has a very fast connection, a slower connection can be allocated thereto. Accordingly, the business owner can provide service to all its users, but has a mechanism by which it can efficiently allocate a more responsive service (e.g., a quicker and more timely connection) to certain clients that meet a predetermined criteria (e.g., length of business relationship, volume of business, etc.).

As can be appreciated, in such a system it is important to the user that the code (e.g., agent) is from a trusted source. For example, if the code is from an impostor, the code can include a malicious virus that destroys or corrupts the user's data or even sends sensitive information to the impostor.

Similarly, it is important to the business owner that the agent is code that was planted by the owner and not code (e.g., agent) written by a non-trusted third party. For example, if a user discovers how the agent operates and changes the code in the agent, the user can deceive the measuring agent into thinking (1) the performance is very poor when in fact the performance is very good; and/or (2) that the client's behavior or traits deserve a higher level of service where in fact the client's actual behavior or traits are not deserving of a higher level of service. In so doing, the third party would defraud the measuring application in order to obtain a high level of service. Accordingly, it is important to have a security mechanism that assures the user that the measuring agent is from a trusted source (e.g., the brokerage service provider). In addition, it is important to have a mechanism to assure the data collection application that information received from the agent is provided by the true agent and not a foreign code that is generated by a hacker.

There are two security approaches to this problem: (1) placing the web server and the data collection application in the same security zone; and (2) placing the web server and the data collection application in different security zones. As described hereinafter, both approaches offer only tolerable solutions that each has different disadvantages and exposure to different security threats.

Web Server and Application in the Same Security Zone

In this approach, the web server and the application must run in the same security perimeter or zone. The security zone can be protected or not protected by a firewall. For example, when an Internet Service Provider (ISP) is hosting the web server, then the application must also run at the ISP site. Running the application at the ISP site may not be desirable for security reasons.

The security zone can also be behind a firewall. FIG. 1 illustrates a block diagram of a case where both the application and the web server reside in a security zone that is behind a firewall. A measuring agent 4 resides in a browser 8. A web server 12 and application measuring server 16 reside in a security zone 20 behind a firewall 24. The measuring agent 4 communicates data to the web server 12 through a secure channel (e.g., a secure socket layer protocol (SSL)). It is noted that the secure HTTP/SSL link passes through the firewall 24. The web server 12 then receives the data and sends the data to a common gateway interface (CGI) script 28 through a first pipe 32. In turn the (CGI) script 28 sends the data to the application measuring server 16 through a second pipe 36.

Unfortunately, attacks on web servers are notorious, and breaches in web server security occur very often. Consequently, putting a web server 12 behind the firewall 24 exposes the system behind the firewall 24 to numerous types of attacks. For example, if the web server 12 begins to malfunction either due to internal problems or by malicious attacks (e.g., through malformed URLs), an intruder may gain access to privileges that can allow the intruder to wreck havoc and cause much damage to the system.

Therefore, web servers that are externally visible to users are typically not placed in the same trusted environment as other mission critical resources or confidential and sensitive data. Instead, these web servers are often hosted by third parties, such as Internet Service Providers, and web applications that operate on confidential data are within their own trusted security zone (e.g., behind their own firewall). In other words, the vulnerability of web servers causes the placement of externally visible web servers in non-trusted or semi-trusted (e.g., a de-militarized zone) rather than in a trusted environment (e.g., behind a firewall) where mission critical applications and confidential data reside.

Web Server and Application in Different Security Zones

FIG. 2 illustrates a block diagram of a second conventional approach for sending data. In this approach the web server and the application reside in different security zones. Those elements that are the same as in FIG. 1 are labeled with the same numeral. It is noted that this approach is more widely utilized because of the threats and exposure, discussed previously, of sensitive data when the web server and the application reside in the same security zones.

A measuring agent 4 resides in a browser 8 as in the case of the system of FIG. 1. An application measuring server 16 resides in a security zone 20 behind a firewall 24. A web server 12 resides in a second security zone 40. The measuring agent 4 communicates data to the web server 12 through a secure channel (e.g., a secure socket layer protocol (SSL)). The web server 12 then receives the data and sends the data to a common gateway interface (CGI) script 44 through a first pipe 48. In turn the (CGI) script 44 sends the data to the application measuring server 16. The script 44 can use a second secure channel (e.g., SSL connection, secure shell (SSH) or a virtual private network (VPN), etc.) to protect the data when crossing the firewall 24.

Unfortunately, this approach suffers from several disadvantages. First, the data being transmitted is exposed at the web server 12. Consequently, if someone breaches the security of the web server 12, the confidential data may be intercepted and used for purposes other than the intended purpose.

Second, there are problems associated with how the communication is established between the web server 12 and the application 16 running behind the firewall. Typically, a CGI script running on behalf of the web server 12 initiates the TCP/IP connection to the measurement application server 16 and operates in a "push" mode. This type of connection is referred to as the "push" mode because data is pushed from the web server 12 to the measurement application server 16 behind the firewall 24. Unfortunately, most firewall security policies do not allow TCP/IP connections that originate from outside the firewall 24. The rationale for this policy is to protect against malicious attacks through such connections. These malicious attacks may be in the form of a denial of service attacks, breaking an application functionality, exploring application weaknesses, or obtaining privileges that allow for penetration of systems behind the firewall 24.

One can change a firewall's security policy to allow incoming TCP/IP connections. However, changing a firewall's open IP addresses and ports is considered to be an extremely sensitive issue. Moreover, many security breaches occur today because of mis-configured firewalls. Consequently, many business institutions have a general policy of prohibiting the opening of IP addresses and ports at the firewall for incoming TCP/IP connections. There are some exceptions, but these exceptions apply primarily to e-mail traffic (e.g., port 25) or HTTP traffic (e.g., port 80 and 443).

Accordingly, there remains a need for a method and system for securely transferring data between an agent in a non-secure environment and a server behind a firewall that overcomes the disadvantages set forth previously.

SUMMARY OF THE INVENTION

It is an object of the present invention to provide a method for passing data efficiently from an agent in a non-secure (e.g., hostile) environment to an application server behind a firewall without requiring a trusted intermediate party (e.g., a web server or secure channels).

It is a further object of the present invention to provide a method for passing data efficiently from an agent in a non-secure (e.g., hostile) environment to an application server behind a firewall without requiring the firewall to open to incoming TCP/IP connections.

It is yet another object of the present invention to provide a method for passing data efficiently from an agent in a non-secure environment to an application server behind a firewall without requiring the security policies of firewalls to be weakened.

A method and system for securely transferring data between an application server and an agent of the application server through a non-trusted node. First, a public key of the application server is embedded in the code of the agent so that verification of the signature of the agent code implicitly authenticates the public key of the application server. Next, a communication link is established between the application server and the non-trusted node through a relay module.

Verification of the signature of the agent signature also provides authentication of the embedded public key of the application server since the public key is part of the downloaded and signed code. In other words, if the user trusts the code, the user also trusts the embedded public key. By embedding the public key in the agent code, the present invention allows for implicit authentication of the public key when the code itself is authenticated (e.g., when the code is signed by a trusted authority).

The agent in turn can use the public key to transfer a secret session key that is utilized to encrypt data that is to be sent to the application server. Since only the owner of the private key associated with the public key can retrieve the session key used for data encryption, should the encrypted data be hi-jacked at the non-trusted node, the hi-jacker cannot recover the information. In addition, it is the application server that initiates the TCP/IP connection with the relay module.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention. The following description and the drawings are illustrative of the invention and are not to be construed as limiting the invention.

Secure Data Transfer System 500

Figure 5:
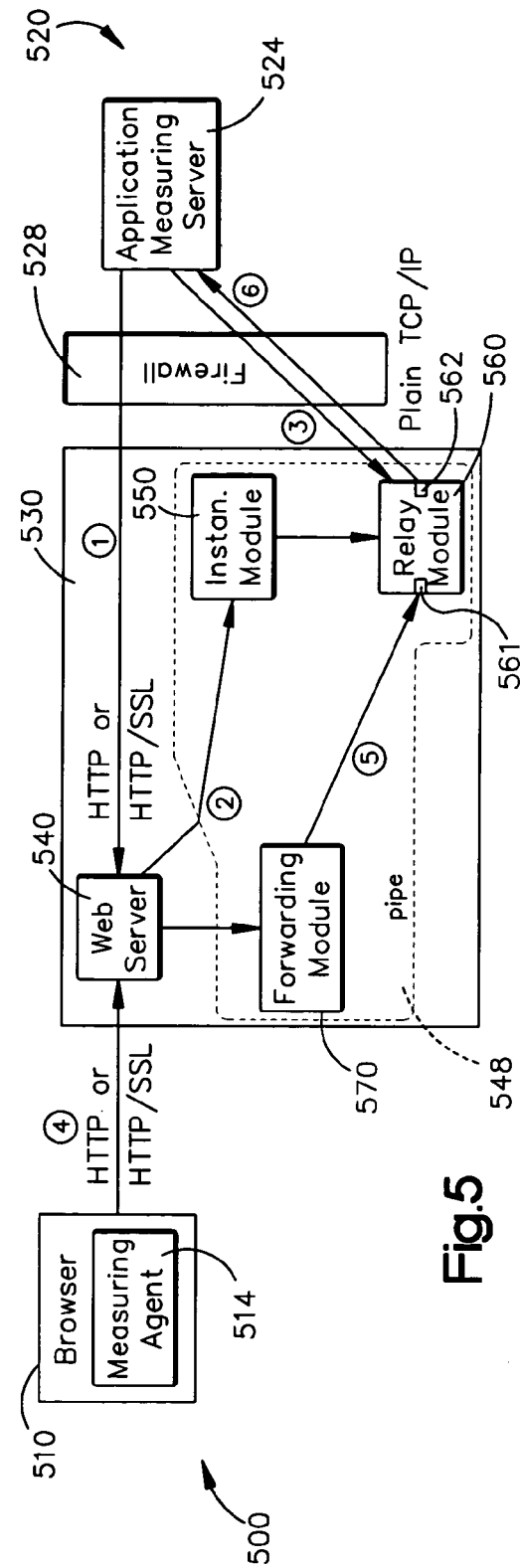
FIG. 5 illustrates a block diagram of a system for securely transferring data that is configured according to one embodiment of the present invention.

FIG. 5 illustrates a block diagram of a system 500 for securely transferring data that is configured according to one embodiment of the present invention. The system 500 includes a first security zone 520 that is behind a firewall 528. A measuring application server program 524 can reside in the first secure zone 520. The programs that are external to the first security zone 520 (i.e., not disposed behind the firewall 528) are considered to be in a non-trusted or non-secure environment (also referred to herein as a hostile environment).

The system 500 also includes a browser program 510 (e.g., a Netscape Communicator browser program or a Windows Internet Explorer browser program) that typically resides on a user's personal computer (PC), and one or more intermediate nodes (e.g., node 530) between the browser program 510 and the application measuring server 524. The browser 510 can download a measuring agent 514 in accordance with steps 400 and 404, which are described in greater detail with reference to FIG. 4.

The intermediate node 530 can be an Internet Service Provider (ISP) web server node for providing Internet access services. Preferably, several key components of the present invention are disposed in the intermediate node 530 that may be a non-secure node.

The present invention provides an end-to-end secure communication link between an agent 514 and an application server 524 even though there is a non-trusted intermediate node therebetween. A secure transfer module 548 of the present invention includes an instantiation module 550, a relay module 560, and optionally a forwarding module 570. The relay module 560 includes a first port 561 for connecting to the forwarding module 570 and a second port 562 for connecting to the application measuring server 524.

The instantiation module 550 specifies a specific port number for the first port 561 and another specific port number for the second port 562 and provides the port numbers to the relay module 560. In turn, the relay module 560 listens on the specified ports. For example, the relay module 560 waits for the measuring application server program to initiate connection to the second port 562 at the specified port number. It is noted that the relay module 560 does not establish the connection with the application measuring server 524, but waits for the application measuring server 524 to make the connection, thereby not requiring any changes to existing security policies of firewall 528.

The instantiation module 550 loads and runs the relay module 560. If a copy of the relay module 560 does not reside on the web server node 530, the instantiation module 550 can download a copy of the relay module from another server and install the copy on the web server 540. The forwarding module 570 is optionally provided to forward data from the measuring agent 514 to the relay module 560 when the connection between the browser 510 and the web server 540 is HTTP based. It is noted that the instantiation module 550 is not needed if a Java applet or an Active X is establishing a direct connection with the relay module 560.

Figure 9:
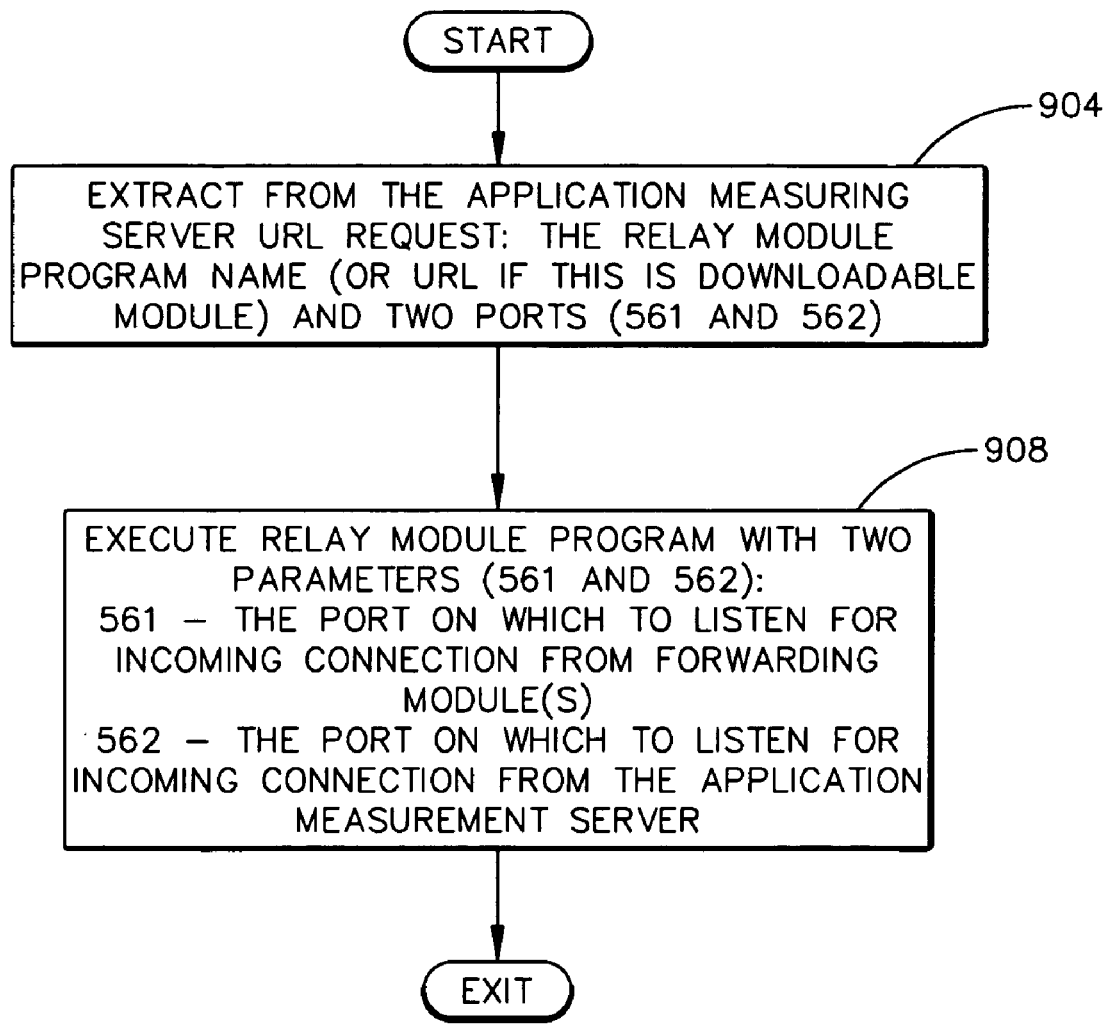
FIG. 9 is a flowchart illustrating the steps performed by the instantiation module of FIG. 5 of one embodiment of the present invention.
Figure 10:
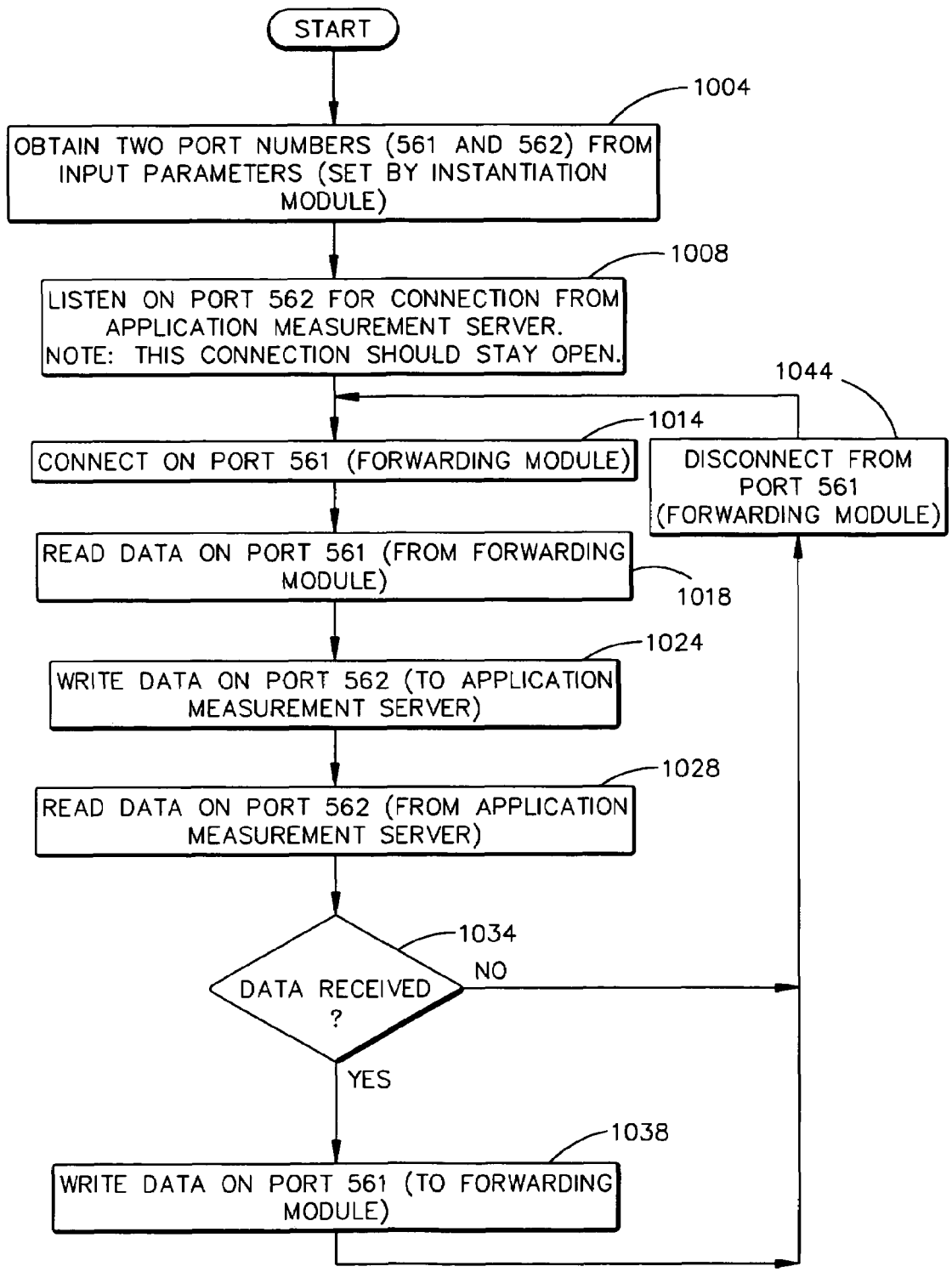
FIG. 10 is a flowchart illustrating the steps performed by the relay module of FIG. 5 of one embodiment of the present invention.
Figure 11:
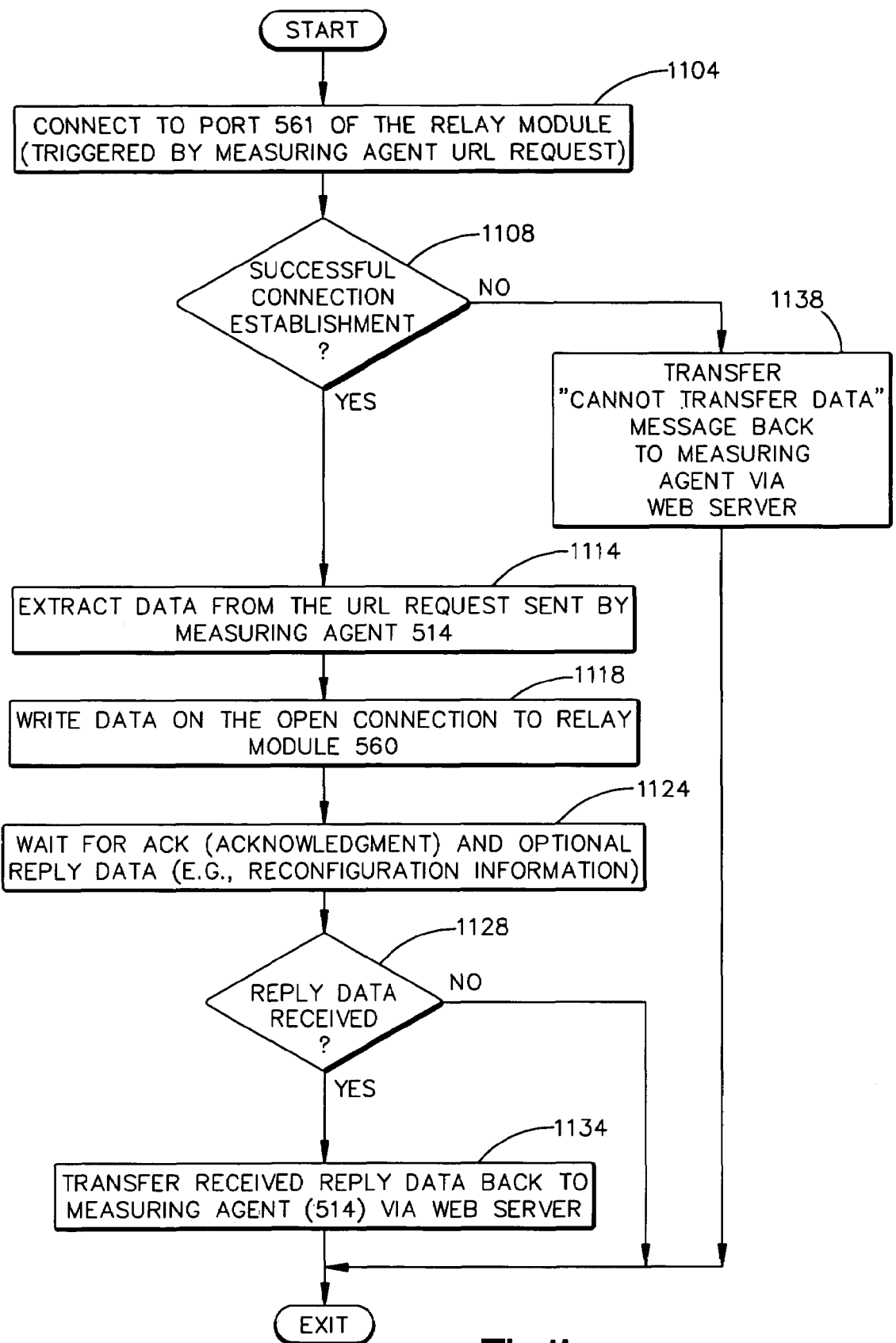
FIG. 11 is a flowchart illustrating the steps performed by the forwarding module of FIG. 5 of one embodiment of the present invention.

Modules 550, 560, and 570 can be implemented with programming instructions, such as CGI scripts, to perform the steps illustrated in FIGS. 9–11, respectively. The modules 550, 560, and 570 are described in greater detail hereinafter with reference to FIGS. 9 to 11.

End-to-End Secure Communication between Browser Client and Application server

Figure 1:
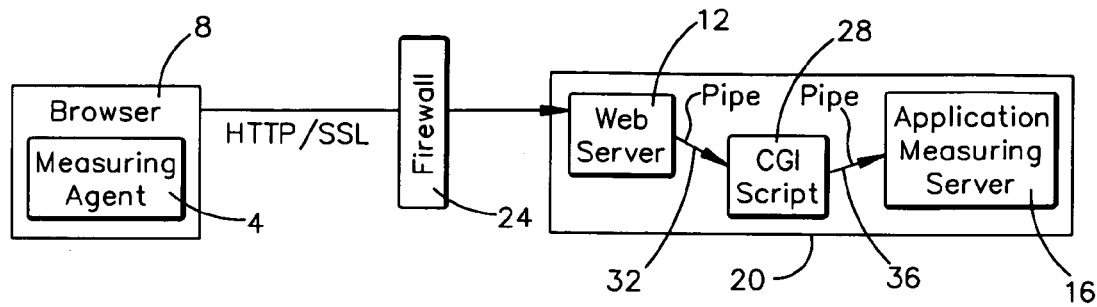
FIG. 1 illustrates a block diagram of a first conventional approach for sending data.
Figure 2:
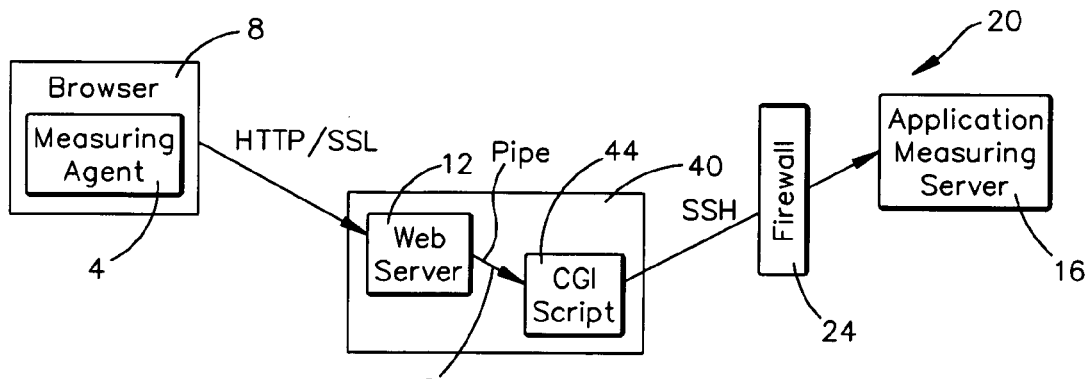
FIG. 2 illustrates a block diagram of a second conventional approach for sending data.
Figure 3:
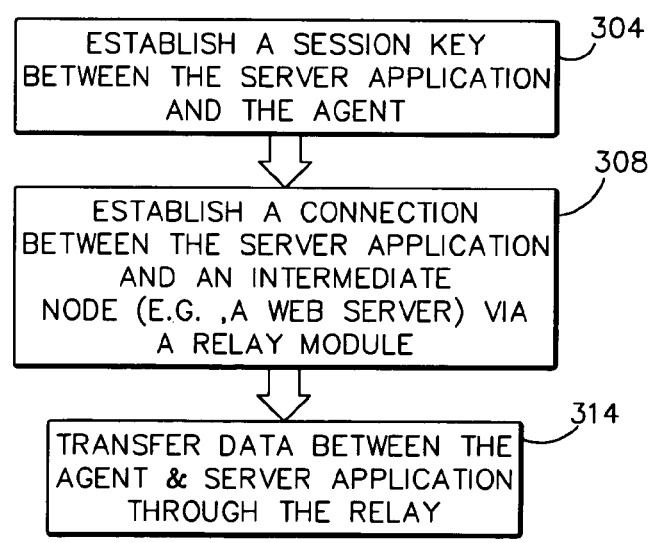
FIG. 3 is a flowchart illustrating the method of one embodiment of the present invention.

FIG. 3 is a diagram illustrating the method of establishing an end-to-end secure communication between a data collecting agent and a data collecting application server in accordance with one embodiment of the present invention. In step 304, a secret key is established (e.g., shared) between the browser client and the application server by utilizing a public key of the application server that is embedded into the agent. In step 308, a connection is established between an intermediate node (e.g., a web server) and the application server by utilizing a relay module that opens a socket, listens on a specified port on the socket, and waits for the application server to make a connection to the specified port. In step 314, data is transferred between the agent and the application server by utilizing the connection established through the relay module.

Establishing a Session Key

Figure 4:
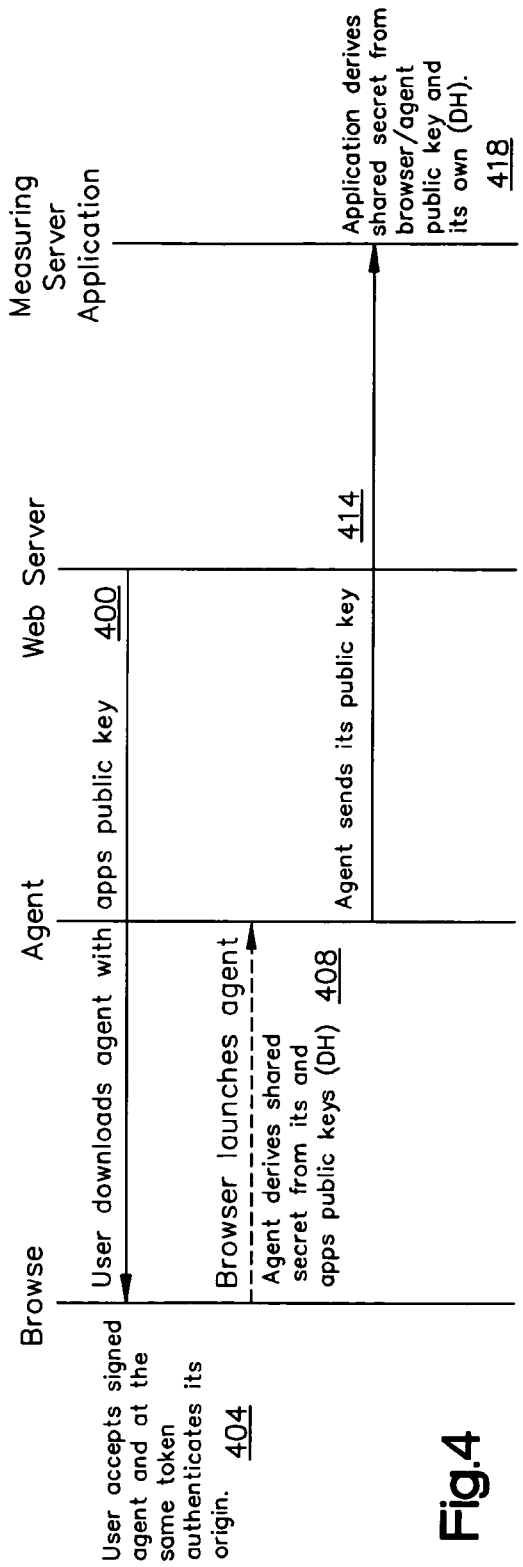
FIG. 4 is a diagram illustrating the steps for establishing a session key between the measuring agent and the measuring server in accordance with one embodiment of the present invention.

FIG. 4 is a diagram illustrating the steps for establishing a session key between the measuring agent and the measuring server in accordance with one embodiment of the present invention. In step 400, a user downloads the measuring agent 514 that includes the public key of the measuring application server program 524. For example, the public key can be appended to, attached to, or embedded in the agent 514, or included in the agent 514 by using some other manner.

In step 404, a user accepts a signed measuring agent code 514 and authenticates the origin of the measuring agent 514 using standard browser verification methods. One aspect of the present invention is including the public key of the measuring server 524 in the measuring agent 514. By so doing, the public key of the measuring server 524 can be conveniently authenticated (i.e., implicitly authenticated) when the user authenticates the agent code. This implicit authentication obviates the need for a user to connect to a certification authority to verify the public key of the measuring server 524.

In step 408, the browser 510 launches the measuring agent 514. In this step, a secret key is established to encrypt and decrypt data to be transmitted between the agent 514 and the measuring application server 524. The secret key can be established by either a key agreement protocol or a key transfer protocol. In a key agreement protocol (e.g., a Diffie-Hellman (DH) public key algorithm), either party can derive the shared secret key based on the other party's public key. In a key transfer protocol (e.g., a RSA public key algorithm), the shared secret key is generated by one party (e.g., by the measuring agent 514), encrypted with the other party's public key (e.g., by the public key of the measuring application server 524), and then transferred to the other party.

In step 418, the measuring application 524 retrieves or derives the shared secret key by utilizing its own private key depending on the method used to establish the secret key.

When authentication of the system that hosts the measuring agent 514 is needed or when the Diffie-Hellman (DH) public key algorithm is used to establish a shared secret key between the measuring agent 514 and the measuring application 524, an end-to-end secure channel (e.g., a channel between the agent 514 and the web server 540) can be utilized to protect the integrity of the public key of the measuring agent 514 if the public key is not certified or encrypted by the shared secret key. The application measuring server program 524 can retrieve the public key of the measuring agent 514 from the web server 540 by also using a secure channel.

A challenge-response protocol, which is well known by those of ordinary skill in the art, can be utilized, and a certificate for the public key of the measuring agent 514 can be required in order to authenticate the measuring agent 514 and to prevent man-in-the-middle attacks. The secure end-to-end communication protocol of the present invention preferably utilizes sequence number in order to prevent replay attacks. Furthermore, a standard encryption algorithm can be utilized to increase confidentiality, and a fast hashing algorithm (e.g., Keyed-Hashing for Message Authentication (HMAC)—IETF RFC 2104) to increase message data integrity and authentication.

Establishing A Connection Between The Measuring Server 524 And The Relay Module 560

Figure 6:
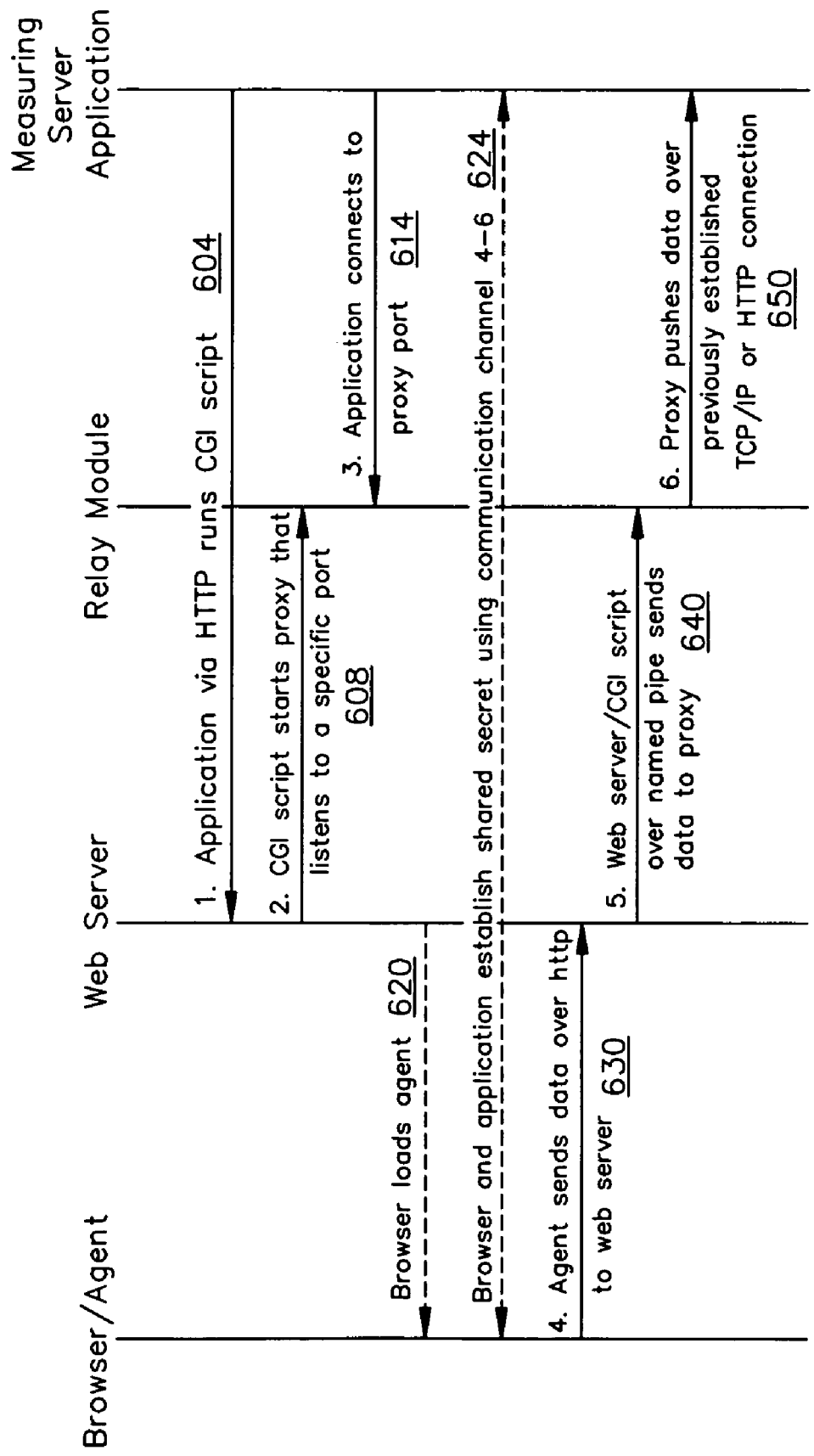
FIG. 6 is a diagram illustrating the steps for establishing a connection between the measuring server and the relay module in accordance with one embodiment of the present invention.

FIG. 6 is a diagram illustrating the steps for establishing a connection between the measuring server and the relay module in accordance with one embodiment of the present invention. In step 604, the measuring application server program 524 runs the instantiation module 550 in response to a request to the web server 540. The web server 540 in turn runs the instantiation module 550 (e.g., a CGI script). The instantiation module 550 retrieves from the application measuring server 524 the specific port on which to listen for incoming connection from the application measuring server 524 and the specific port on which to connect to the forwarding module 570. The instantiation module 550 can also retrieve the name of the relay module 560 and run the relay module 560.

In one embodiment, the relay module 560 creates a first port (e.g., a TCP/IP socket) on the specified port number and listens for an incoming TCP/IP connection on the specified port. Once the first socket is successfully created, the control returns to the measuring application server 524. The measuring application server program 524 then initiates a TCP/IP connection to the relay module 560 using the open TCP/IP socket. In addition, the relay module 560 creates a port (e.g., a TCP/IP socket) on the specified port number on which to listen for incoming traffic from the forwarding module 570. The specific port numbers are parameters that are passed from the instantiation module 550 to the relay module 560. The steps performed by the instantiation module 550 in accordance with one embodiment of the present invention are described in greater detail hereinafter with reference to FIG. 9.

Alternatively, the connection between the relay module 560 and the measuring application server 524 can be established via electronic mail. This alternative is especially useful for those firewalls that do not allow any other types of TCP/IP connections (incoming or outgoing). Since regular electronic mail is universally accepted as a communication channel, most firewalls allow for incoming e-mail.

In step 608, the instantiation module 550 starts the relay module 560 that listens to the specified port. The steps performed by the relay module 560 in accordance with one embodiment of the present invention are described in greater detail hereinafter with reference to FIG. 9.

In step 614, the measuring application server program 524 connects to the relay module 560 at the specified port. Certain firewall configurations require special instructions to allow outgoing TCP/IP connections. In such cases, a standard SOCKS proxy, which can run on the firewall 528, can be utilized to accomplish "sockification" of the measuring application server program 524. "Sockification" links the measuring application 524 with a SOCKS library in order to run a SOCKS protocol on top of a TCP/IP connection.

In step 620, the browser 510 loads the measuring agent 514. In step 624, the measuring agent 514 and the measuring application server 524 establish a secret key. It is noted that steps 620 and 624 can occur anytime prior to step 630.

In step 630, the measuring agent 514 encrypts the data using the secret key and sends the encrypted data over a connection (e.g., an HTTP connection) to the web server 540. In step 640, the web server 540 cooperates with the forwarding module 570 to send the data to the relay module 560 over a predetermined pipe or port. Preferably a pipe is utilized for process to process communication within the same system. When a TCP/IP protocol is used, ports are utilized. It is noted that on the same machine, the use of a pipe can be more efficient and use fewer resources. The steps performed by the forwarding module 570 in accordance with one embodiment of the present invention are described in greater detail hereinafter with reference to FIG. 9.

In step 650, the relay module 560 pushes the data received from the forwarding module 570 over the previously established connected (e.g., a previously established TCP/IP connection or an HTTP connection). Furthermore, the relay module 560 can also pull information from the measuring server 524 (e.g., re-configuration parameters) and pass this information to the agent 514 via the forwarding module 570. Accordingly, the present invention provides a bidirectional end-to-end secure communication link between the agent 514 and the measuring server 524. It is noted that in this example, since HTTP is a request/reply protocol between the measuring agent 514 and the measuring server 524, the measuring server 524 can only push information to the agent 514 as a reply to the agent request (e.g., the HTTP request). However, in other non-request/reply protocols, the measuring server 524 can push information to the agent 514.

Measuring Agent 514

Figure 7:
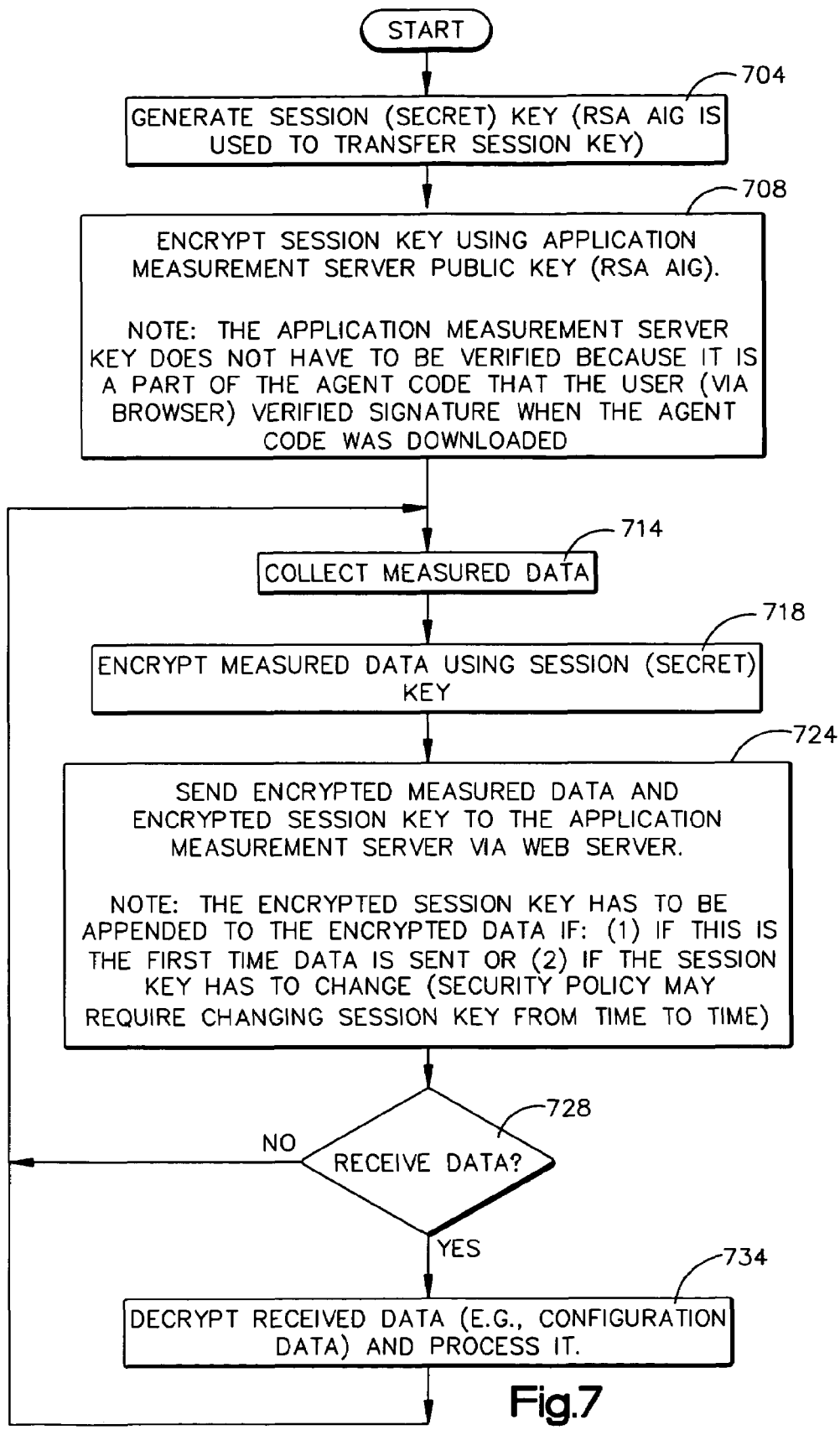
FIG. 7 is a flowchart illustrating the steps performed by the measuring agent of FIG. 5 the according to one embodiment of the present invention.

FIG. 7 is a flowchart illustrating the steps performed by the measuring agent 514 of FIG. 5 the according to one embodiment of the present invention. In step 704, when a key transfer protocol (e.g., RSA algorithm) is utilized, the measuring agent 514 generates a session key (e.g., a secret key). This step can be omitted in a key agreement protocol (e.g., Diffie-Hellman public key algorithm) where the measuring server 524 can independently derive the session key by utilizing the other party's public key.

In step 708, the measuring agent 514 encrypts the session key by using the measurement server's public key. It is noted that the measurement server's public key does not need to be verified because it is embedded as part of the measurement agent's code, whose signature the user verified through the browser program when the measuring agent code is initially downloaded.

In step 714, the measuring agent 514 collects data. In step 718, the measuring agent 514 encrypts the data collected in step 714 using the session key. In step 724, the measuring agent 514 sends the encrypted data to the measurement server via a non-trusted intermediate node (e.g., the web server node 530). In step 724, the measuring agent 514 can also include (e.g., append) the encrypted session key (i.e., the session key encrypted with the measuring server's public key) with the encrypted data under certain circumstances. These circumstances can include (1) if this is the first time data is being transmitted to the measuring server 524 or (2) if the session key has to change for some reason, such as, to adhere to predetermined security policies.

In step 728, the measuring agent 514 determines if the measuring server 524 has sent any data for the measuring agent 514 to receive. If no, processing continues at processing step 714. If yes, the measuring agent 514 decrypts the received data (e.g., configuration data) and processes the data in step 734.

Measuring Server 524

Figure 8:
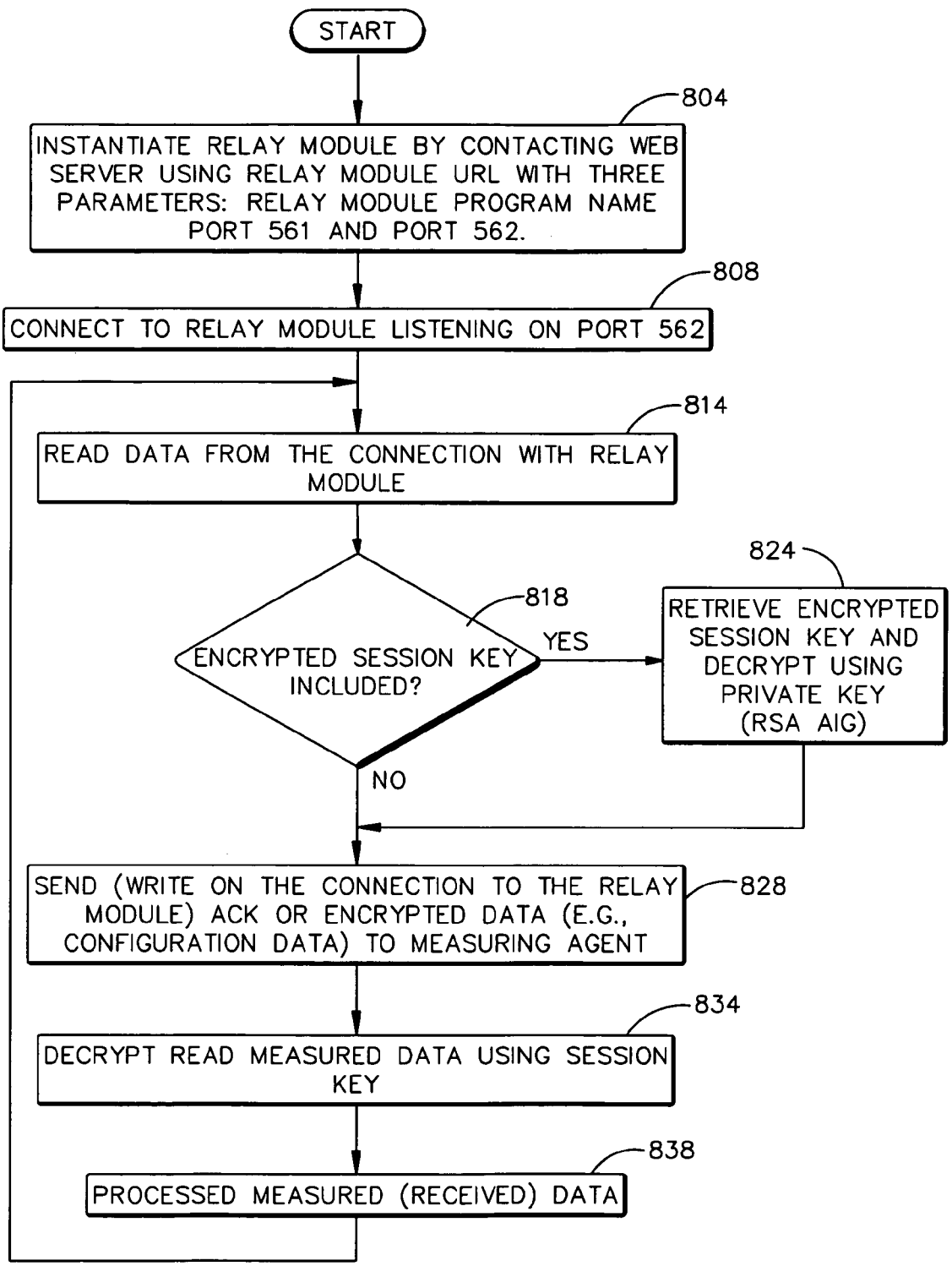
FIG. 8 is a flowchart illustrating the steps performed by the measuring server of FIG. 5 of one embodiment of the present invention.

FIG. 8 is a flowchart illustrating the steps performed by the measuring server 524 of FIG. 5 of one embodiment of the present invention. In step 804, the measuring server 524 instantiates the relay module 560 by contacting the web server 540 and providing the URL of the relay module 560 with three parameters: (1) the program name of the relay module; (2) a port number for the first port 561; and (3) a port number of the second port 562.

In step 808, the measuring server 524 connects to the relay module 560 that is listening on the specified port number at the second port 562. In step 814, the measuring server 524 reads data through the connection with the relay module 560. In step 818, a determination is made whether the encrypted session key is included in the received data. If yes, in step 824, the measuring server 524 decrypts the encrypted session key by utilizing the private key of the measuring server 524.

If no, in step 828, the measuring server 524 sends information to the measuring agent 514 via the connection to the relay module 560 (e.g., by writing the data to the connection). For example, this information can be an acknowledgment (ACK) that data from the agent has been received or other data for the agent (e.g., configuration data) encrypted with the session key.

In step 834, the measuring server 524 decrypts the data received in 814 by utilizing the session key. In step 838, the measuring server 524 processes the data decrypted in step 834.

Instantiation Module 550

FIG. 9 is a flowchart illustrating the steps performed by the instantiation module 550 of FIG. 5 of one embodiment of the present invention. In step 904, the instantiation module 550 extracts the program name of the relay module, the port number for the first port 561 and the port number for the second port 562 from the URL request of the measuring server 524. In step 908, the instantiation module 550 executes the relay module 560 with two parameters: (1) the port number for the first port 561 and (2) the port number for the second port 562. As described earlier, the first port 561 listens for incoming connection from the forwarding module and the second port 562 listens for incoming connection from the measurement server 524.

Relay Module 560

FIG. 10 is a flowchart illustrating the steps performed by the relay module 560 of FIG. 5 of one embodiment of the present invention. In step 1004, the relay module 560 receives the two port numbers for the first 561 and second port 562, respectively as input parameters set by the instantiation module 550. In step 1008, the relay module listens on the second port for a connection from the measurement server 524. Preferably, this connection remains open. In step 1014, the relay module 560 connects to the forwarding module 570 on the first port 561. In step 1018, the relay module 560 reads data on the first port 561 from the forwarding module 570. In step 1024, the relay module 560 writes data on the second port 562 to the measurement server 524. In step 1028, the relay module 560 reads data on the second port 561 from the measurement server 524. In step 1034, a determination is made whether data is received. If yes, in step 1038, the relay module 560 writes data on the first port 561 to the forwarding module 570. If no, in step 1044, the relay module 560 disconnects from the first port 561 and the forwarding module 570.

Forwarding Module 570

FIG. 11 is a flowchart illustrating the steps performed by the forwarding module 570 of FIG. 5 of one embodiment of the present invention. In step 1104, the forwarding module 570 connects to the first port 561 of the relay module 560. This step may be triggered by the URL request of the measuring agent 514. In step 1108, a determination is made whether a connection has been successfully established. If yes, in step 1114, the forwarding module 570 extracts data from the URL request sent by the measuring agent 514. If no, in step 1138, the forwarding module 570 sends a "Cannot Transfer Data" message back to the measuring agent 514 via the Web server 540 and exits.

In step 1118, the forwarding module 570 writes data on the open connection to the relay module 560. In step 1124, the forwarding module 570 waits for an acknowledgment (ACK) and optional reply data (e.g., re-configuration information) from the measuring server 524.

In step 1128, a determination is made whether a reply data has been received. If the reply data has been received, then in step 1134 the forwarding module 570 transfers the received reply data to the measuring agent 514 via the web server 540. If no, the processing skips step 1134 and exits.

It is noted that the principles of the present invention has been described in connection with an example that includes a data collecting agent and a corresponding data collecting server.

However, the teachings of the present invention can be applied to other applications and other situations whenever there is a need to transfer data from an application in a non-secure environment to a server in a trusted security zone or trusted environment. A non-secure (e.g., hostile) environment can be any environment (e.g., a non-trusted environment or semi-trusted environment) that is separate from an environment where mission critical applications and confidential data reside. The trusted environment can be the security zone behind a firewall.

Accordingly, a method and system for passing data efficiently between an agent in a hostile environment to a application server behind a firewall without requiring a trusted intermediate party (e.g., a web server or secure channels) has been described.

One advantage of the present invention is the provision of end-to-end security not merely a point-to-point security. By providing end-to-end security, the relay module 560 or any module running as part of the intermediate node 530 (e.g., a web server node or environment) does not have to be trusted. For example, if the encrypted data is hijacked at the intermediate node 530, the encrypted data is not exposed since the hijacker cannot recover the data without the application server's private key.

Another advantage of the present invention is that by embedding the public key of the application server in the agent code, the public key is implicitly authenticated when the user verifies the signature of the agent code. Accordingly, the present invention obviates the need for and attendant complexities (e.g., cumbersome procedure for determining a source for the public key, accessing a certification authority, etc.) involved in the explicit authentication of the public key, thereby saving time and simplifying the process for the user.

A further advantage of the present invention is that it does not weaken the existing security infrastructure. For example, the present invention does not require a firewall to make exceptions to its security policies by accepting incoming connections through the firewall.

Another advantage of the present invention is that it is non-intrusive to the client browser and the web server. Regarding the client browser, the agent code that incorporates the public key of the application server is downloaded using standard procedures for downloading any application without need for further configuration or plug-in applications. Regarding the web server, the present invention can be implemented as CGI scripts that are uploaded in the usual fashion to a CGI bin directory for subsequent access by the web server.

The foregoing description has provided numerous examples of the present invention. It will be appreciated that various modifications and changes may be made thereto without departing from the broader scope of the invention as set forth in the appended claims.

What is claimed is:

1. A method for securely transferring data between an agent and an application server through a non-secure node comprising:
   (a) establishing a session key between the agent and the application server by utilizing a public key of the application server; wherein the public key of the application server is embedded in the agent to enable the agent to derive the session key; and
   (b) establishing an end-to-end secure connection between the agent and the application server by using the session key and by establishing a communication link between the application server and the non-secure node by using a relay module.

2. The method of claim 1 wherein establishing a communication link between the application server and the non-secure node by using a relay module comprises:
   dynamically instantiating, by the application server, the relay module having a first port for communicating with the application server and a second port for communicating with the agent, the relay module listening on a first predetermined port number on the first port and a second predetermined port number on the second port; and
   the application server connecting to the first port of the relay module to establish a connection therewith.

3. The method of claim 2 wherein establishing a communication link between the application server and the agent through a relay module further comprises:
   pushing data encrypted by the established session key from the agent to the application server over the end-to-end secure connection.

4. The method of claim 2 wherein establishing a communication link between the application server and the agent through a relay module further comprises:
   pulling data encrypted by the session key from the application server over the end-to-end secure connection to the agent.

5. The method of claim 1 wherein establishing a session key between the agent and the application server by utilizing a public key of the application server further comprises:
   establishing a shared secret key between the application server and the agent for encrypting and decrypting data sent therebetween.

6. The method of claim 5 wherein establishing a shared secret key between the application server and the agent for encrypting and decrypting data sent therebetween comprises:
   encrypting the shared secret key with the public key of the application server to generate an encrypted shared key;
   sending the encrypted shared secret key to the application server; and
   decrpyting the shared secret key with the private key of the application server.

7. The method of claim 5 wherein establishing a shared secret key between the application server and the agent utilizes a key transfer protocol.

8. The method of claim 7 wherein the key transfer protocol is the Rivest, Shamir, Adleman (RSA) public key algorithm.

9. The method of claim 5 wherein establishing a shared secret key between the application server and the agent for encrypting and decrypting data sent therebetween utilizes a key agreement protocol.

10. The method of claim 9 wherein the key agreement protocol is the Diffie-Hellman (DH) public key algorithm.

11. The method of claim 1 further comprising transferring data between the agent and the relay module via an unsecure communication link.

12. The method of securely transferring data between an application server and an agent of the application server through a non-secure environment having a web-server and the agent, the method comprising:
   a) a user accessing the web-server to download the agent therefrom; wherein the agent includes a public key of the application server;
   b) the agent deriving a shared session key with the application server by using the public key of the application server, the shared session key for use in encrypting and decrypting data to be transferred between the agent and the application server;
   c) the application server establishing a connection to the web-server; and
   d) the agent contacting the web server by using a first protocol to send data encrypted by the session key to the application server over the connection between the web-server and the application server.

13. The method of claim 12 wherein the application server establishing a connection to the web-server further comprises
   c1) the application server dynamically instantiating a relay module by sending a URL associated with the relay module to the web-server, the URL specifying a first predetermined port for communication between the web-server and the relay module;

c2) the application server connecting to the relay module on a first predetermined port; and c3) the application server reading data from the relay module through the connection on the first predetermined port.

14. The method of claim 13 wherein the agent contacting the web-server by using a first protocol to send data encrypted by the session key to the application server over the connection between the web-server and the application server further comprises d1) the agent encrypting the session key with the public key of the application server;

d2) the agent collecting data;

d3) the agent encrypting the collected data with the session key;

d4) sending the encrypted session key and encrypted measured data to the application server by using a forwarding module that connects to a second predetermined port of the relay module.

15. The method of claim 12 wherein the first protocol is one of HTTP and HTTP/SSL.

16. The method of claim 12 comprising transferring data between the agent and the web-server via an unsecure communication link.

17. A secure data transfer system for connecting a non-secure node to an application server behind a firewall comprising:

a) a web-server in the non-secure node;

b) a relay in the non-secure node that is dynamically instantiated by the application server, the relay being configured by the application server to have a first port for listening for a connection from the application server;

wherein the application server connects to the relay on the first port and reads data from the first port.

18. The secure data transfer system of claim 17 wherein the relay does not initiate the connection with the application server but waits for the application server to establish the connection.

19. The secure data transfer system of claim 18 wherein the non-secure node is a web-server node.

20. A secure data transfer system for establishing an end-to-end secure connection between an agent and an application server behind a firewall through a non-secure node comprising:

a) a web-server residing in the non-secure node, the web-server having the agent that includes a public key of the application server;

b) a browser in communication with the web-server for downloading the agent from the web-server;

c) a secure transfer module residing in the non-secure node; and d) an application server in a secure zone for initiating a connection to the web-server via the secure transfer module.

21. The secure data transfer system of claim 20 wherein the secure transfer module further comprises:

c1) a relay module for listening to a first port and a second port;

c2) an instantiation module for executing the relay module in response to a command from the application server;

c3) a forwarding module for transferring data from the agent to the relay module in response to a command from the agent; and wherein the relay module listens to the first port for a connection by the application server and listens to the second port for a connection by the forwarding module.

22. A method, comprising:

embedding in code of an agent a public key of an application server that is behind a firewall;

downloading the code of the agent and the public key into a browser;

verifying the agent to authenticate the public key of the application server;

establishing a communication link between the application server and a relay module that is in a non-secure environment and between the browser and the relay module; and securely transferring data from the browser through the relay module to the application server without requiring a trusted intermediate party.

23. The method of claim 22 further comprising collecting data with the agent.

24. The method of claim 23 wherein collecting data with the agent further comprises measuring time required to load data into the browser.

25. The method of claim 22 wherein the communication link between the browser and the relay module is an unsecure communication link.

* * * * *